United States Patent
Dugan et al.

(10) Patent No.: US 7,162,098 B1
(45) Date of Patent: Jan. 9, 2007

(54) SYSTEM AND METHOD FOR INCREASING TEMPORAL AND SPATIAL CAPACITY OF SYSTEMS THAT AMPLITUDE QUANTIZE DATA PRIOR TO PROCESSING

(75) Inventors: Peter J. Dugan, Ithaca, NY (US); Patrick Ouellette, Lanark (CA); Michael J. Riess, Chenango Forks, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 740 days.

(21) Appl. No.: 10/361,350

(22) Filed: Feb. 10, 2003

Related U.S. Application Data (60) Provisional application No. 60/412,650, filed on Sep. 20, 2002.

(51) Int. Cl.
*G06K 9/36* (2006.01)
*G06K 9/32* (2006.01)
*G06K 9/34* (2006.01)

(52) U.S. Cl. .................... 382/251; 382/299
(58) Field of Classification Search ............ 382/112, 382/172, 173, 190, 194, 199, 224, 232, 237, 382/251, 254, 299, 300, 305, 321; 348/62; 358/303, 400, 445, 447
See application file for complete search history.

(56) References Cited

U.S. PATENT DOCUMENTS

| | | | | |
|---|---|---|---|---|
| 4,661,850 A * | 4/1987 | Strolle et al. | ............... | 348/450 |
| 4,845,561 A * | 7/1989 | Doyle et al. | ............. | 348/424.1 |
| 5,361,309 A | 11/1994 | Sugiyama | ...................... | 382/9 |
| 5,384,865 A * | 1/1995 | Loveridge | ................... | 382/262 |
| 5,396,441 A * | 3/1995 | Ozawa | ....................... | 708/290 |
| 5,608,821 A | 3/1997 | Metcalfe et al. | ............. | 382/252 |
| 5,751,855 A | 5/1998 | Saund | ........................ | 382/224 |
| 5,805,619 A * | 9/1998 | Gardner et al. | ............. | 714/814 |
| 5,828,771 A | 10/1998 | Bloomberg | .................. | 382/112 |
| 6,055,336 A | 4/2000 | Niki | ........................... | 382/237 |
| 6,115,482 A | 9/2000 | Sears et al. | .................. | 382/114 |
| 6,347,156 B1 | 2/2002 | Kamada et al. | ............. | 382/237 |
| 6,731,240 B1 * | 5/2004 | Dybdal et al. | .............. | 342/359 |

OTHER PUBLICATIONS

*Introduction to Cameras*, http://www.theimagingsource.com/prod/cam/camintro_2.htm. last updated on Jun. 8, 2001.
*Introduction to Frame Grabbers*, http://www.theimagingsource.com/prod/grab/grabintro_2.htm, last updated on Feb. 16, 2001.

(Continued)

*Primary Examiner*—Andrew W. Johns
*Assistant Examiner*—Amir Alavi
(74) *Attorney, Agent, or Firm*—Burns & Levinson LLP; Jacob N. Erlich; David W. Gomes

(57) ABSTRACT

A system and method for collecting relatively high resolution amplitude data with a conventional sensing device from a signal source that is sampled at a relatively low characteristic scan resolution, and then generating relatively high scan resolution, relatively low resolution amplitude data through real-time application of up-sampling and quantization algorithms. The resulting relatively high scan resolution, relatively low resolution amplitude data closely approximate the image quality resulting from a sensing device operating at a much higher scan resolution, using a conventional data collection system. The invention relates generally to systems that collect the high resolution amplitude data that must be converted to low resolution amplitude data in order to maximize throughput rates.

30 Claims, 6 Drawing Sheets

OTHER PUBLICATIONS

Meijering, E., A Chronology of Interpolation: From Ancient Astronomy to Modern Signal and Image Processing, *Proceedings of the IEEE*, vol. 90, No. 3, Mar. 2002.

Rogelj, P. et al., *Industrial OCR*, Laboratory for Artificial Perception, University of Ljubljana, http:/luz.fe.uni-lj.si/english/vision/OCR/, download date Feb. 25, 2002, pp. 319-342.

Srihari, S. et al., *Character Recognition*, Center of Excellence for Document Analysis and Recognition, State University of New York at Buffalo, CEDAR-TR-95-1, Jan. 1995, http://www.cedar.buffalo.edu/Publications/TechReps/OCR.ocr.html, download date Feb. 25, 2002.

Trier, O. D. and Taxt, T., *Evaluation of Binarization Methods for Document Images*, pp. 31-35. Copyright 1995, IEEE.

U.S. Appl. No. 60/412,650, filed Sep. 20, 2002. Title: System and Method for Increasing Temporal and Spatial Capacity of Systems that Amplitude Quantize Data Prior to Processing. Applicant(s): Michael J. Reiss et al.

\* cited by examiner

HELVETICA 5
ABCDEFGHIJKLMN
OPQRSTUVWXYZ

HELVETICA FONT SIZE 5
ACQUIRED AT 130 DPI
THEN BINARIZED AND ENLARGED

*Figure 6A* (PRIOR ART)

HELVETICA 5
ABCDEFGHIJKLMN
OPQRSTUVWXYZ

HELVETICA FONT SIZE 5
ACQUIRED AT 130 DPI
UP-SAMPLED TO 260 DPI
THEN BINARIZED AND ENLARGED

*Figure 6B*

HELVETICA 5
ABCDEFGHIJKLMN
OPQRSTUVWXYZ

HELVETICA FONT SIZE 5
ACQUIRED AT 234 DPI
THEN BINARIZED AND ENLARGED

*Figure 6C* (PRIOR ART)

SYSTEM AND METHOD FOR INCREASING TEMPORAL AND SPATIAL CAPACITY OF SYSTEMS THAT AMPLITUDE QUANTIZE DATA PRIOR TO PROCESSING

CROSS REFERENCE TO RELATED APPLICATIONS

The present application claims priority to U.S. Provisional Application No. 60/412,650 filed Sep. 20, 2002 entitled SYSTEM AND METHOD FOR INCREASING TEMPORAL AND SPATIAL CAPACITY OF SYSTEMS THAT AMPLITUDE QUANTIZE DATA PRIOR TO PROCESSING which is incorporated herein in its entirety by reference.

BACKGROUND OF THE INVENTION

This invention relates generally to systems that collect and process high resolution amplitude data, but ultimately use relatively low resolution amplitude data because of computer processing constraint considerations. In particular, this invention is directed to increasing the effective sampling capacity of the collection and processing system without increasing the sophistication of the data collection device.

A high resolution amplitude data collection device generally samples signal amplitude information through an array of elements that each converts incident energy (which may be a light wave) into analog signals. The resulting analog signals are generally digitized for further processing by a computer. An image processing device, for example, produces files that represent gray scale values of each pixel within the image. Thresholding or quantizing techniques are frequently used to reduce image data down to elements that are simpler to work with and smaller in size, so as to increase processing speed.

Image post-processing techniques, for example spatial up-sampling of a gray level file prior to performing thresholding or quantizing, are typically used with copiers and flatbed scanning devices. These techniques tend to improve the quality of the quantized image.

Spatial up-sampling refers to a process for mathematically generating the probable values of higher resolution digital information in a data stream. In the field of image processing, spatial up-sampling increases the resolution of the features in an image by inserting interpolated intermediate values.

Signal quantizing is a technique for processing data by identifying and extracting mathematically-defined features. Quantization of the high resolution amplitude data reduces the information volume to a manageable size to make electronic processing feasible. For example, an 8-bit image has 256 different gray levels. Typically the number of gray levels is reduced by a process known as binarization, a form of quantization. In some methods, the gray level values of eight pixels surrounding each pixel in the image are evaluated and a simple thresholding scheme is used. Thresholding is a process that involves taking the difference between the gray-level value of the middle pixel and the surrounding pixels, and then marking the position of the middle pixel in a resulting array with a gray level value of either 0 (difference equal or below the threshold) or 1 (difference above a certain threshold). The resulting array highlights the features of interest, as well as allowing the packing and compression of data to a significantly smaller size.

What is needed is a data collection acceleration system that performs asynchronous and real-time spatial up-sampling and amplitude quantizing for live operations, such as when a camera images parcels rapidly traveling past the camera on a conveyor belt. The ideal data collection acceleration system would also allow flexible selection of spatial up-sampling and amplitude quantizing techniques, based on the known optimal performance of such algorithms on particular inputs. A data collection acceleration system that results from these improvements could increase the spatial and temporal capacity, herein referred to as the scan resolution, of the collection device without upgrading the collection equipment and without decreasing the overall performance of the data processing system.

SUMMARY OF THE INVENTION

The problems set forth above as well as further and other problems are solved by the present invention. The solutions and advantages of the present invention are achieved by the illustrative embodiment of the present invention described hereinbelow.

The present invention includes a data collection acceleration system and method that perform asynchronous and real-time spatial up-sampling and amplitude quantizing for live operations that collect relatively high resolution amplitude data, but only process an amplitude quantized version of the data. Through real-time up-sampling and amplitude quantizing, the data collection acceleration system and method of the present invention effectively increase the scan resolution of a data collection system without upgrading the data collection device and with a minimal decrease in quality of the amplitude quantized image. In the present invention, a signal source's amplitude is sampled at a relatively high resolution by a data collection device that is designed to sample the signal at a relatively low characteristic scan resolution. Using the system and method of the present invention, the quality of the resulting amplitude quantized image is very close to that of an amplitude quantized image generated using a data collection device designed to sample at a relatively high amplitude resolution, relatively high scan resolution.

The system of the present invention includes a data collection device, part of a data collection subsystem, for sampling a signal's amplitude at a relatively high resolution and at a relatively low characteristic scan resolution. The system of the present invention also includes an algorithm selection subsystem for establishing appropriate algorithms for processing the relatively high amplitude resolution, relatively low characteristic scan resolution data. Finally, the system of the present invention includes a data processing subsystem that, in real time, executes the appropriate algorithms to generate an amplitude quantized image of relatively high scan resolution from the relatively low characteristic scan resolution, relatively high resolution amplitude data.

The algorithm selection subsystem of the present invention is capable of establishing selected spatial up-sample algorithms and amplitude quantizing algorithms known to optimally perform for a particular signal source. The data collection subsystem of the present invention has a characteristic scan resolution which is, in the present invention, relatively low in comparison to the scan resolution of the resulting image. The data processing subsystem is operably connected to the data collection subsystem and the algorithm selection subsystem. The data processing subsystem is capable of receiving algorithm selections or dynamically loading algorithms from the algorithm selection subsystem and applying the selected or loaded algorithms to the relatively low characteristic scan resolution, relatively high resolution amplitude data in real-time and in parallel with other on-going CPU operations. The data processing subsystem executes the selected spatial up-sample algorithms and amplitude quantizing algorithms against the relatively low characteristic scan resolution, relatively high resolution amplitude data to convert it to a relatively high scan resolution, amplitude quantized image. The data processing subsystem is capable of transferring the amplitude quantized image to a conventional CPU or another system for further processing.

The system can further include a first storage location and a second storage location, both operably connected to the data processing system. The first and second storage locations can be one in the same, and both can be computer memory, computer mass storage, or computer networked storage. The data processing subsystem is capable of storing in real time, in the first storage location, intermediate data that result from the application of the selected spatial up-sample algorithm. The data processing subsystem is further capable of storing in real time, in the second storage location, the output data that result from the application of the selected amplitude quantizing algorithm.

The method of present invention includes the step of establishing through user choice, automatic computation or sensing, or system default, among other ways, a selected spatial up-sample algorithm and a selected amplitude quantizing algorithm appropriate for a particular signal source. The method further includes the step of sampling the signal source's amplitude at a relatively high resolution and at a relatively low characteristic scan resolution. The method further includes the steps of applying the selected spatial up-sample algorithm and the selected amplitude quantizing algorithm to the relatively low characteristic scan resolution, relatively high resolution amplitude data in real-time to create relatively high scan resolution, relatively low resolution amplitude output data. The relatively high scan resolution, relatively low resolution amplitude output data are of substantially the same quality as if the signal source's amplitude were sampled at a relatively high resolution and a relatively high characteristic scan resolution, and then without changing the scan resolution, quantized into relatively low resolution amplitude output data.

For example, the method could include the steps of establishing a spatial up-sample algorithm and amplitude quantizing algorithm through menu selection, default, or automatic means, according to the type of signal source the system is sampling, for example, a FedEX™ next day air box traveling on a conveyor belt. Next, the method could include the step of configuring a conventional programmable frame grabber device to use the selected algorithms. The method could next include the steps of scanning the gray data image of the box as it passes by the camera with a conventional line scan camera sampling the reflected light amplitude at a relatively high resolution and sampling the surface area at a relatively low characteristic scan resolution. The method could next include the steps of transferring the data from the camera to the programmable frame grabber, and applying, in the programmable frame grabber, the spatial up-sample algorithm and the amplitude quantizing algorithm to the relatively low characteristic scan resolution, relatively high resolution amplitude data in real-time on a line-by-line basis to create an amplitude quantized image of relatively high scan resolution. The resulting amplitude quantized image is of substantially the same quality as an amplitude quantized image that would have been sampled with a relatively high scan resolution, relatively high resolution amplitude data collection device.

For a better understanding of the present invention, together with other and further objects thereof, reference is made to the accompanying drawings and detailed description. The scope of the present invention is pointed out in the appended claims.

DETAILED DESCRIPTION OF THE INVENTION

The present invention is now described more fully hereinafter with reference to the accompanying drawings, in which the illustrative embodiment of the present invention is shown.

Figure 1:
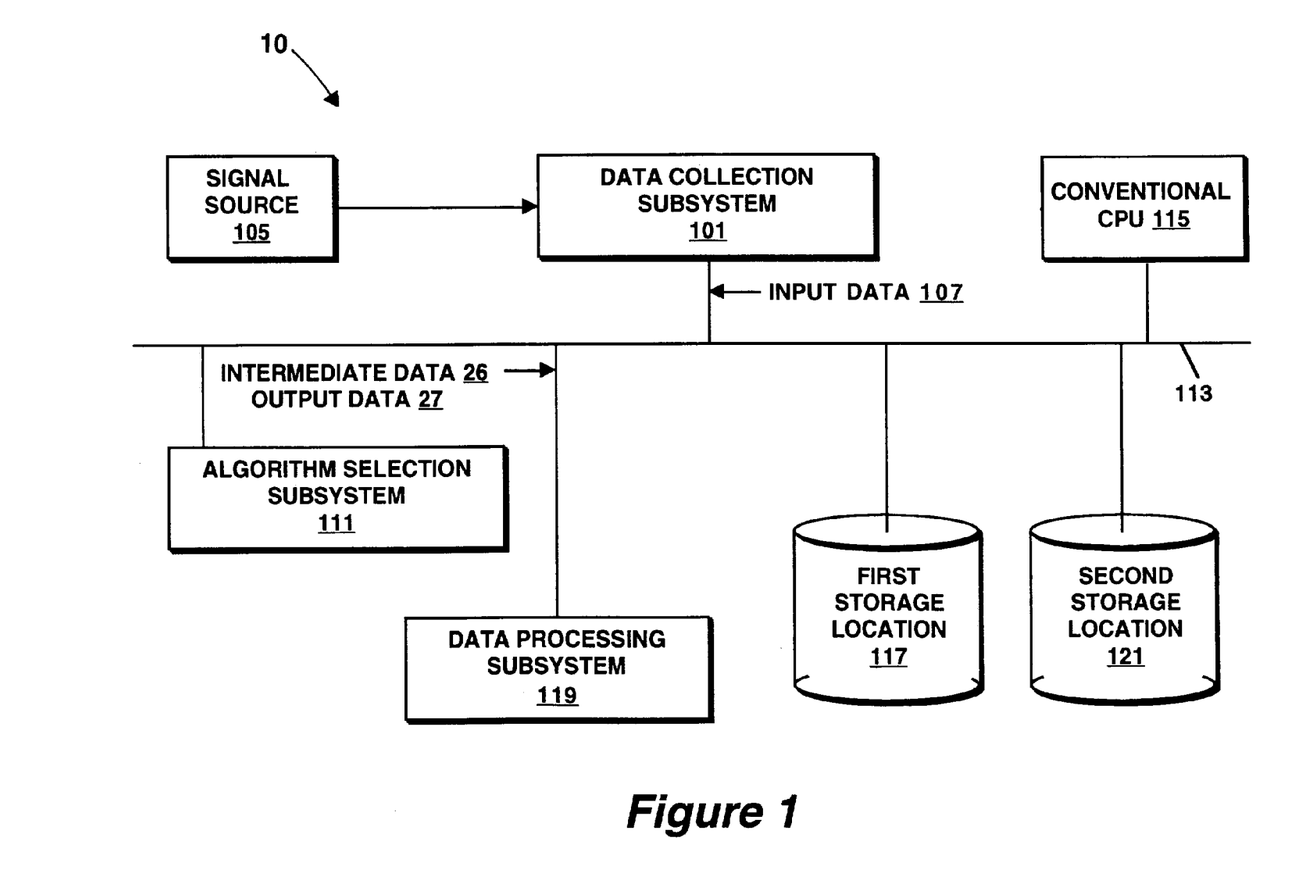
FIG. 1 is a schematic block diagram of the high resolution amplitude data collection acceleration system of the illustrative embodiment of the present invention.

The system of the illustrative embodiment of the present invention is generally indicated by numerical designation 10 as shown in FIG. 1. System 10 generally includes a signal source 105, a data collection subsystem 101, an algorithm selection subsystem 111, and a data processing subsystem 119. The data collection subsystem 101 samples signal source's 105 reflected light amplitude at a relatively high resolution and samples a signal source's surface area at a relatively low characteristic scan resolution. The data collection subsystem 101 transmits in real-time, through operable connection 113, the relatively low characteristic scan resolution, relatively high resolution amplitude input data 107 on a line-by-line basis to data processing subsystem 119. While the system 10 is designed for real-time operation, batch processing is not precluded by this invention. Operable connection 113 can include, but isn't limited to, any or all of the following: a data bus, an internet connection, a local area network connection, an ANSI/TIA/EIA-644 interface, a Cameralink™ specification compliant physical interface, or any other type of electrical connection that allows the transmission of electronic data.

Continuing to refer to FIG. 1, the algorithm selection subsystem 111 allows the selection of a spatial up-sample algorithm and an amplitude quantizing algorithm. The selection can happen automatically or manually by use of, for example, default values, user input, algorithm or mail type selection, or any other means. The data processing subsystem 119 receives relatively low characteristic scan resolution, relatively high resolution amplitude input data 107 from the data collection subsystem 101 and executes the selected spatial up-sample algorithm to convert the relatively low characteristic scan resolution, relatively high resolution amplitude input data 107 to relatively high scan resolution, relatively high resolution amplitude intermediate data 26. These intermediate data 26 may be stored, as they are sampled and processed, for possible use by other systems in a first storage location 117. Continuing to refer to FIG. 1, the data processing subsystem 119 also executes the selected amplitude quantizing algorithm to convert the relatively high scan resolution, relatively high resolution amplitude data to relatively high scan resolution, relatively low resolution amplitude output data 27. These data may also be stored, as they are processed, for possible use by other systems in a second storage location 121. Conventional CPU 115 could access both intermediate data 26 and output data 27 for real-time or batch processing.

Figure 2:
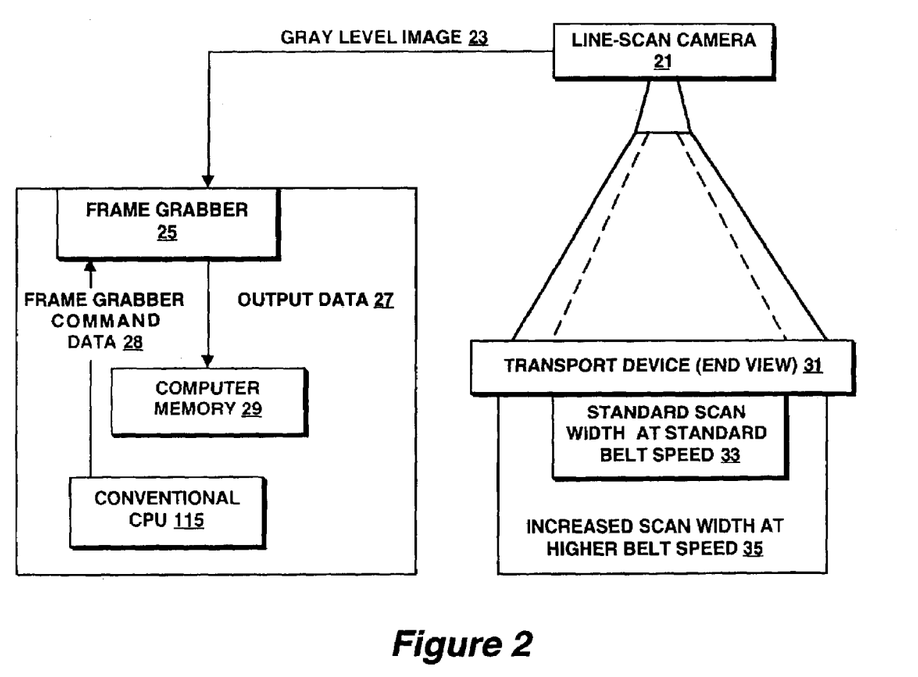
FIG. 2 is a schematic block diagram of the illustrative embodiment of a high resolution amplitude data collection system of the present invention.

Referring to FIGS. 1 and 2, in the illustrative embodiment of the present invention, signal source 105 (shown in FIG. 1) is illustratively indicated in FIG. 2 as a set of objects traveling on transport device 31 (shown in FIG. 2). Also data collection subsystem 101 (shown in FIG. 1) is illustratively indicated in FIG. 2 by line-scan camera 21 which is configured to accommodate the increased scan width and higher belt speed 35. The camera so configured scans signal data arriving from the objects on transport device 31 at a relatively low characteristic scan resolution while still sampling signal amplitude at a relatively high resolution. These sampled data are transmitted to the illustrative embodiment of data processing subsystem 119 (shown in FIG. 2 as including conventional programmable frame grabber 25) as gray level image 23. Also transmitted to conventional programmable frame grabber 25 are spatial up-sample and amplitude quantizing algorithms or algorithm selection 28 identified from algorithm selection subsystem 111 (FIG. 1) which executes, in the illustrative embodiment, in conventional CPU 115 (FIG. 2). Conventional programmable frame grabber 25 processes incoming gray level image 23 in real-time to produce relatively high scan resolution, relatively low resolution amplitude output data 27 which can be stored in computer memory 29 (among other places) for fast access and further processing by conventional CPU 115.

Continuing to refer to FIG. 2, a standard scan width at standard belt speed 33 of the prior art is shown as relatively smaller than an increased scan width at higher belt speed 35 of the present invention. In the illustrative embodiment, scan width can be increased by at least a factor of 1.75 with minimal loss of data quality in the quantized image. In addition, transport device 31 of the present invention moves at a faster speed relative to the transport devices in systems of the prior art. In the system of the present invention, the transport device can be speeded up by a factor of almost 1.75 while still scanning at the at least 1.75 increased width, without a requiring a more sophisticated line-scan camera 21 and with minimal loss of data quality of the output data 27. The speed of the transport device is limited, in this case to almost 1.75, because of restrictions such as lighting and camera throughput limitations, not limitations with respect to the system of the present invention.

Figure 3:
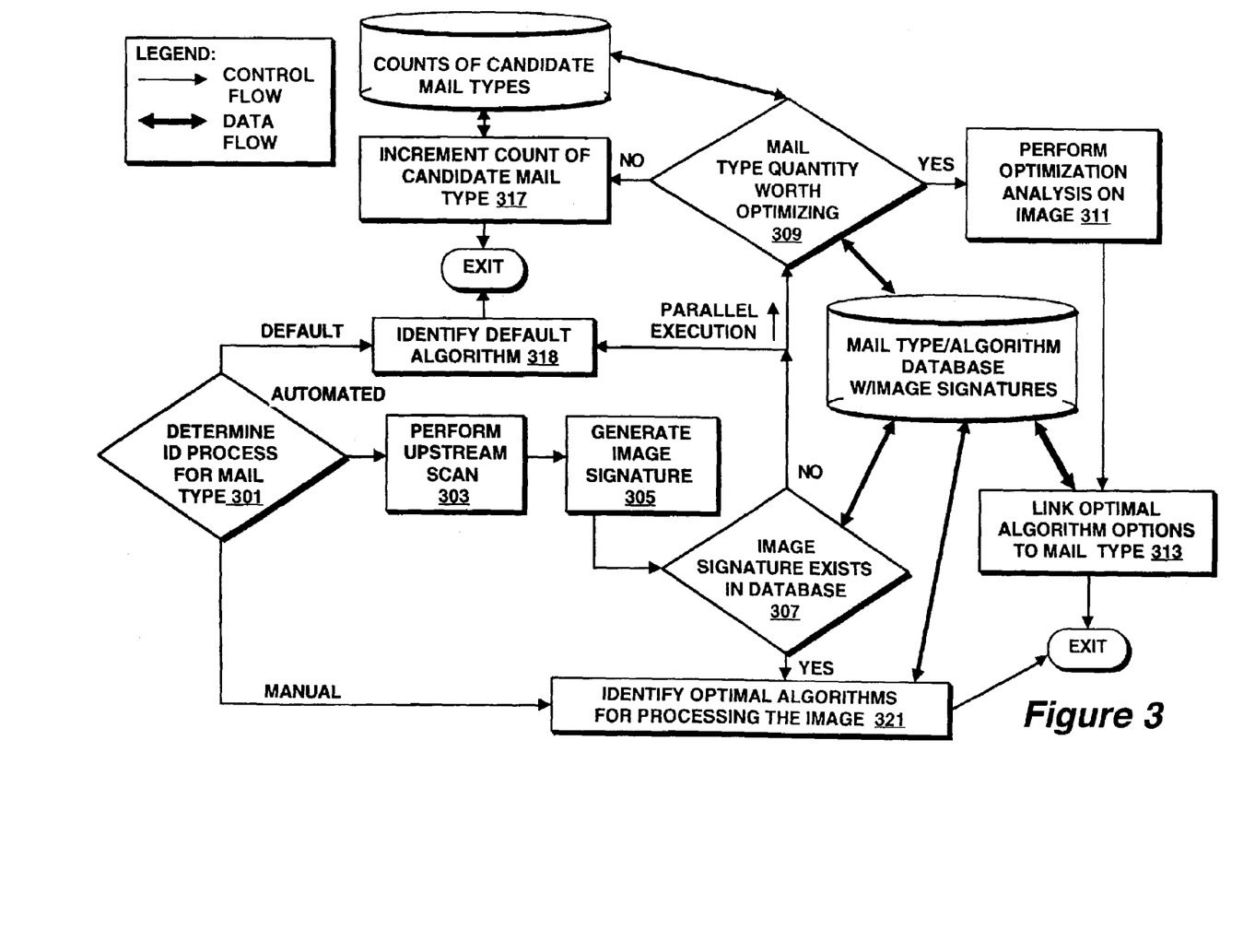
FIG. 3 is a flowchart of the method of the illustrative embodiment of the algorithm selection subsystem.

Referring now to FIG. 3, for each image that is scanned in, the illustrative flow of the algorithm selection system is shown. The method of the illustrative embodiment of the present invention includes a first step of determining an identification process for a mail type (decision step 301). If the identification process is "default", the method includes the step of identifying default algorithms to use for processing the image and exiting (method step 318). If the identification process is manual, the method includes the step of identifying, possibly through user query, optimal algorithms for processing the image (method step 321) and exiting. In this step, for example, a user could be prompted for the type of mail to be processed, or the user could be prompted for the actual algorithms to be used. If the identification process is automated, the method includes the steps of performing an upstream scan of the mail piece being imaged (method step 303) and generating an image signature in order to determine the mail type (method step 305). The method next includes the step of determining if the image signature exists in an image signature database (decision step 307). If the image signature exists in the database, the method next includes the step of retrieving from the database of mail type/algorithms the optimal algorithms for processing the image (method step 321). If the image signature does not exist in the database the method of the illustrative embodiment includes the next parallel steps of identifying default algorithms (method step 318) and exiting, as well as determining if the quantity of images is sufficient such that a mail type should be optimized and stored in the database (decision step 309). If there are currently not enough images of that particular mail type to warrant optimization, the method next includes the steps of incrementing and storing a count of the candidate mail type (method step 317) and exiting. If there are enough images of that particular type to warrant optimization (decision step 309), the method next includes the steps of performing an optimization analysis on this type of image (method step 311), linking optimal algorithm options to the mail type/algorithm database, storing the mail type in association with an image signature and optimal algorithms (method step 313), and exiting.

Figure 4:
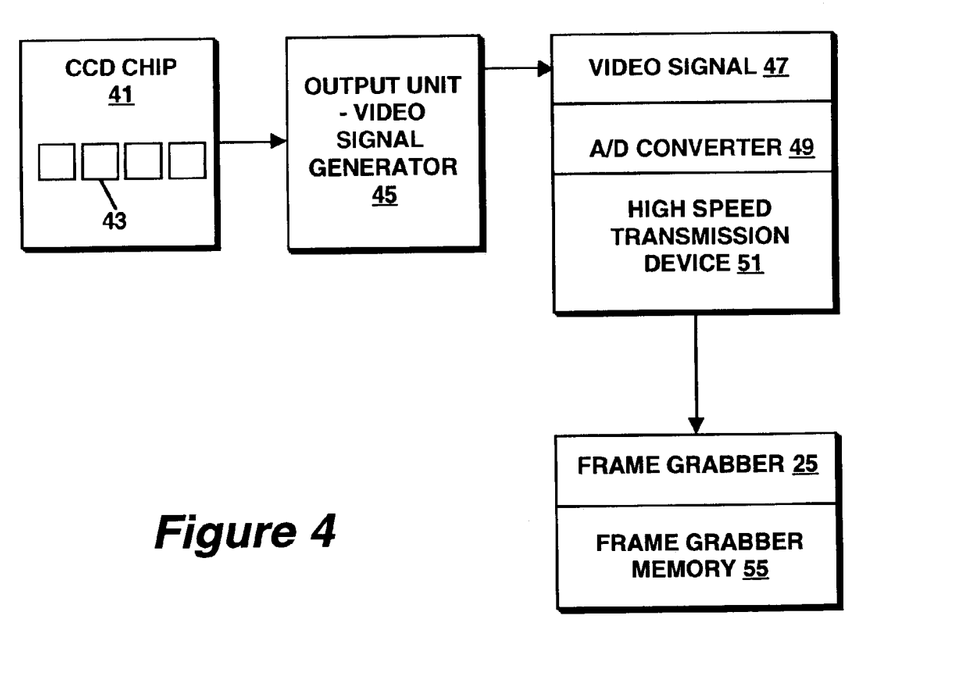
FIG. 4 is a schematic block diagram of the components of the illustrative embodiment of the data collection subsystem (a conventional line-scan camera) and the data processing subsystem (a conventional programmable frame grabber)

Referring now to FIG. 4, in the illustrative embodiment of the present invention, the digital line-scan camera 21 (shown in FIG. 2) can be an Accu-sort® model AV3700. This type of digital line-scan camera 21 includes a conventional one-dimensional Charge Coupled Device (CCD) 41, a one-dimensional matrix 43 of light-sensitive elements, an output unit 45 that generates video signal 47, an A/D converter 49 that digitizes video signal 47, and finally a high speed transmission device 51. In the illustrative embodiment, the high speed transmission device 51 allows data rates on two channels up to forty Megabytes/second/channel, but the invention isn't limited to a particular number of channels or a particular data rate. Conventional programmable frame grabber 25 may be a model Accu-sort® Accu-link frame grabber (under development by Accu-sort®), but is not limited to this make and model of frame grabber. The conventional programmable frame grabber 25 that is used has the capability of receiving data such as those generated by the AV3700, but in general any combination of digital or analog camera and compatible programmable frame grabber of similar or higher capability or other coupled devices can be used to perform the processing specified herein. The particular camera/frame grabber combination is described herein for illustrative purposes only.

Referring now to FIGS. 1, 2, and 4, after the algorithm selection subsystem 111 (FIG. 1) (previously described) selects the suitable algorithms for the particular image, the data processing subsystem 119 (FIG. 1), including software that is either uploaded (e.g. the algorithms) or resident executing in frame grabber 25 (FIG. 2) and software executing in CPU 115 (FIG. 1) in the illustrative embodiment, continues processing as follows. In the illustrative embodiment, data processing subsystem 119 uploads the algorithms, that can be later identified by the algorithm selection subsystem 111 at initialization, into frame grabber 25 by commercial utilities provided with the frame grabber product. The present invention is not limited to any method of loading the algorithms into the frame grabber, i.e. the algorithms do not have to be loaded at initialization, but can be dynamically loaded during object processing. Before an object is scanned, data processing subsystem 119 of the illustrative embodiment receives an identification number for the object, and receives dimensional information, such as parcel height, about the object from an upstream device. The dimensional information is an indicator of the relatively low characteristic scan resolution. This information is combined with the distance from the surface of the parcel to the lens to determine the relatively low characteristic scan resolution of the image. The relatively low characteristic scan resolution is proportional to the relatively high scan resolution, required by the application, by an up-sample factor. Data processing subsystem 119 receives algorithm selection results from algorithm selection subsystem 111 and calculates the up-sample factor for the object. Referring to FIG. 2, conventional CPU 115 then uploads to frame grabber 25 frame grabber commands and data 28, which can include up-sample factors, an indication of the selected algorithms, and the algorithms themselves. At this point, and referring to FIG. 4, frame grabber 25 executes computer code that buffers in a FIFO queue, in frame grabber memory 55, the number of lines necessary to perform the selected up-sample and binarization algorithms. A single line of output data 27 (FIG. 2) is generated from the processing of the buffered lines. The oldest line in the buffer is deleted or possibly saved as the new line is read in and processing continues. Processed output data 27 are transmitted to computer memory 29 (FIG. 2) on a line-by-line basis after the selected algorithms are executed by the frame grabber 25 against the buffer of data in the queue. Local processing can continue on CPU 115, the processed image can be stored in second storage location 121 (FIG. 1), or the image can be electronically transmitted elsewhere over electronic interface 113 (FIG. 1).

Possible spatial up-sample algorithms from which a selection can be made include, but aren't limited to, linear, nearest-neighbor, Lagrange- and Gaussian-based interpolators, Blackman-Harris windowed-sinc kernels, quadratic and cubic convolution, and cubic B-spline. Descriptions of these techniques are given in *A Chronology of Interpolation: From Ancient Astronomy to Modern Signal and Image Processing*, Meijering, E., *Proceedings of the IEEE*. Vol. 90. No. 3. March 2002, incorporated in its entirety herein by reference.

Possible quantization algorithms from which a selection can be made include, but aren't limited to, locally adaptive methods such as Yankowitz/Bruckstein and Improved White/Rohrer, globally adaptive methods such as Otsu and Papur/Sahoo/Wong, and modified locally adaptive methods such as Niblack and Eikvil/Taxt/Moen. Other methods are outlined in *Evaluation of Binarization Methods for Document Images*, Trier, O. D. and Taxt, T., *IEEE Transaction on Pattern Analysis and Machine Intelligence*, 17, pp. 312–315, 1995, incorporated in its entirety herein by reference.

Figure 5:
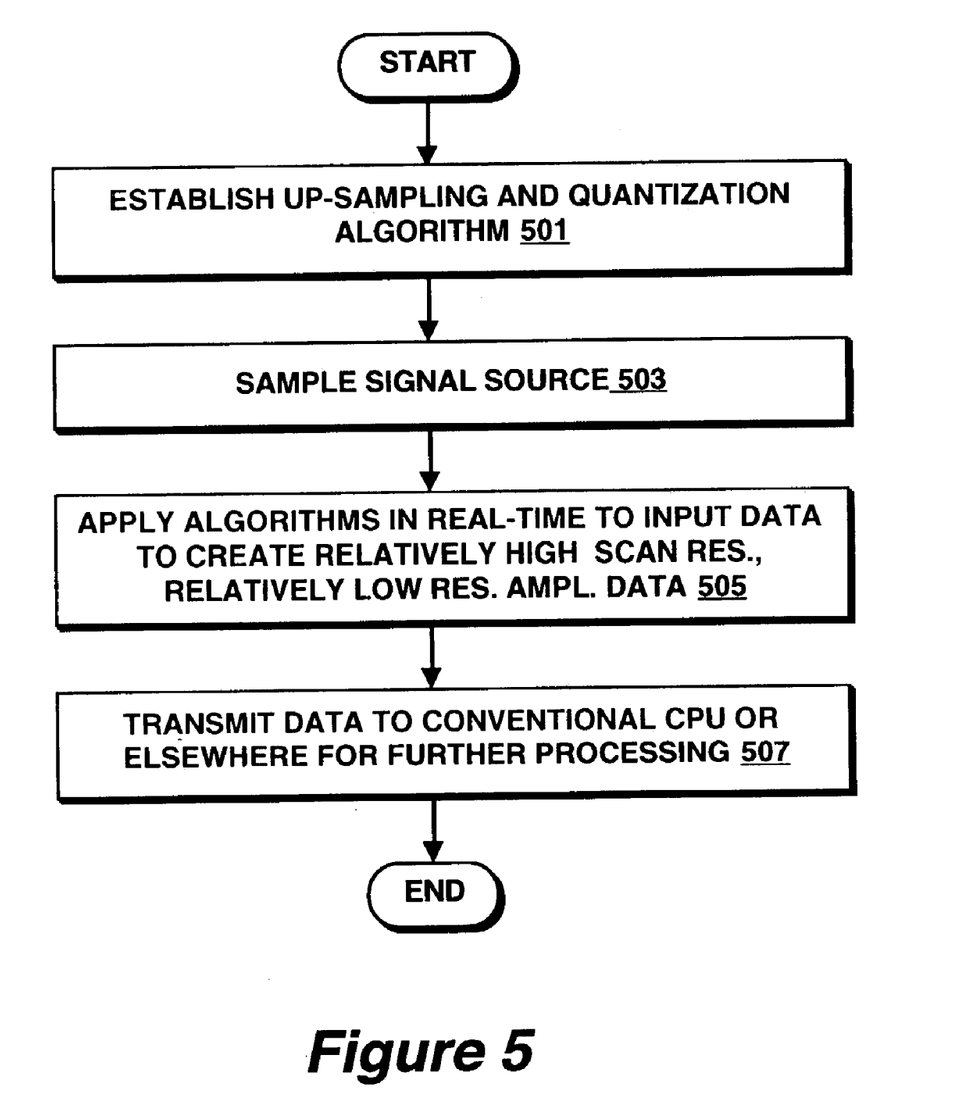
FIG. 5 is a flow chart of the method of the illustrative embodiment of the present invention.

Referring now to FIG. 5, the method of the illustrative embodiment of the present invention includes the steps of establishing through user choice, automatic computation or sensing, or system default, among other ways, a selected spatial up-sample algorithm and a selected amplitude quantizing algorithm appropriate for a particular signal source (method step 501), and sampling the signal source's amplitude at a relatively high resolution and at a relatively low characteristic scan resolution (method step 503). The method of the present invention further includes the step of applying the selected spatial up-sample algorithm and the selected amplitude quantizing algorithm to the relatively low characteristic scan resolution, relatively high resolution amplitude data in real-time to create relatively high scan resolution, relatively low resolution amplitude output data (method step 505). The method further includes the steps of transmitting the relatively high scan resolution, relatively low resolution amplitude data to another electronic processing means (method step 507).

The method of the present invention can be, in whole or in part, implemented electronically. Signals representing actions taken by elements of the system can travel over electronic communications media. Control and data information can be electronically executed and stored on computer-readable media. The system can be implemented to execute on a node in a computer network. Common forms of computer-readable media include, for example, a floppy disk, a flexible disk, a hard disk, magnetic tape, or any other magnetic medium, a CDROM or any other optical medium, punched cards, paper tape, or any other physical medium with patterns of holes, a RAM, a PROM, and EPROM, a FLASH-EPROM, or any other memory chip or cartridge, a carrier wave, or any other medium from which a computer can read.

Figure 6A:
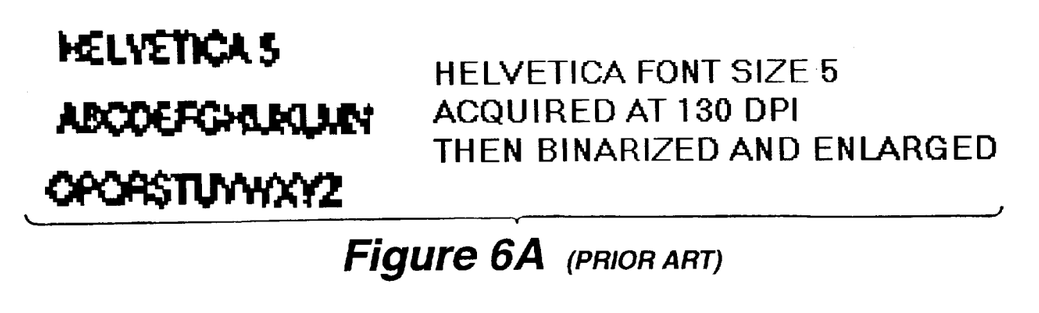
FIG. 6A is an example of resulting character image data after collection using a relatively low scan resolution data collection device and after processing by a system of the prior art.
Figure 6B:
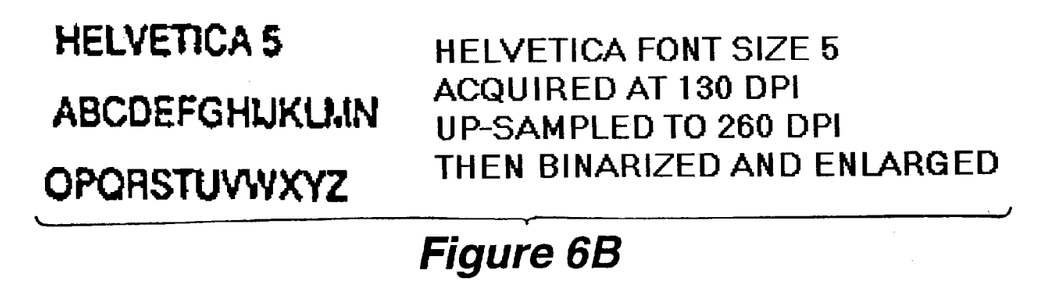
FIG. 6B is an example of resulting character image data after collection using a collection device such as the one referred to in FIG. 6A, and after processing by the illustrative embodiment of the present invention.
Figure 6C:
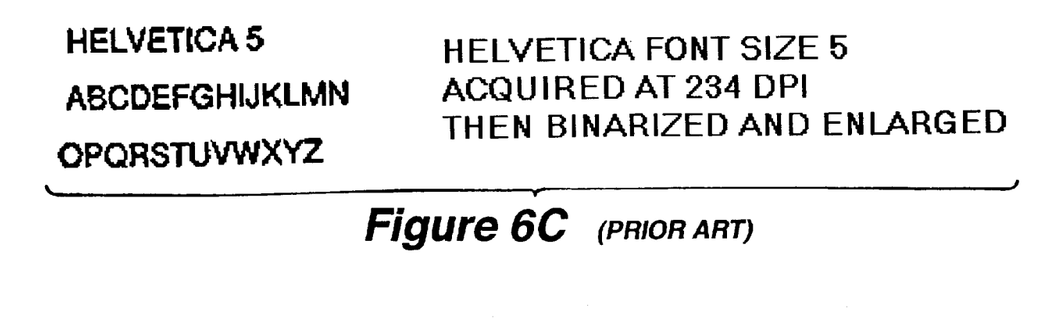
FIG. 6C is an example of resulting character image data after collection using a more sophisticated data collection device than FIGS. 6A and 6B, and after processing by a system of the prior art.

Referring now to FIG. 6A (PRIOR ART), a line-scan camera, typical of both the prior art and the illustrative embodiment, samples signal data at a relatively low characteristic scan resolution (e.g. 130 DPI), and its amplitude at a relatively high resolution. The data are quantized according to the systems of the prior art as shown in FIG. 6A (these figures have all been scaled to similar size for purposes of comparison). However, in the case of FIG. 6A, with a system of the prior art, the image appears coarse. Now turning to FIG. 6B and using the data processing subsystem 119 (shown in FIG. 1) of the present invention, data are sampled at the same relatively low characteristic scan resolution (e.g. 130 DPI) as in the prior art, but processed in real-time to produce a relatively high scan resolution (in this case 2.0 times the originally-sampled scan resolution), relatively low resolution amplitude data. Note that even when the transport device operates at a relatively high speed, the scan width is increased to relatively high scan width, at higher belt speed 35 (FIG. 2), and the line-scan camera 21 samples signal data at a relatively low characteristic scan resolution (the same as the prior art shown in FIG. 6A), the quality of the data is significantly improved because of the real-time application of the selected algorithms. Referring again to FIG. 2, if transport device 31 operates at a relatively slow speed and at standard scan width at standard belt speed 33, the combination of which produces a higher spatial resolution, the prior art can achieve an image of the quality of FIG. 6C (PRIOR ART). To maintain scan width at higher belt speed 35 as in configurations FIGS. 6A and 6B and still achieve the quality of FIGS. 6B and 6C (PRIOR ART), a more sophisticated line-scan camera than the illustrative line-scan camera of the present invention is required. Comparing the image of FIG. 6B with the image of FIG. 6C (PRIOR ART), it is clear that data quality is very similar because of the processing set forth herein as part of the present invention.

Although the invention has been described with respect to various embodiments, it should be realized this invention is also capable of a wide variety of further and other embodiments within the spirit and scope of the appended claims.

What is claimed is:

1. A data collection acceleration method comprising the steps of:
   sampling an amplitude of a signal source at a relatively high resolution;
   sampling the signal source at a relatively low characteristic spatial/temporal frequency (scan resolution);
   producing input data from said step of sampling the amplitude of said signal source and said step of sampling said signal source at a relatively low characteristic spatial/temporal frequency; and
   applying a spatial up-sample algorithm and an amplitude quantizing algorithm to said input data in real-time to create relatively high scan resolution, relatively low resolution amplitude output data of substantially the same quality as if said signal source were sampled at a relatively high scan resolution, relatively high amplitude resolution and quantized into relatively high scan resolution, relatively low amplitude resolution output data.

2. The data collection acceleration method as in claim 1 further comprising the step of establishing said spatial up-sample algorithm and said amplitude quantizing algorithm.

3. The data collection acceleration method as in claim 2 wherein said step of establishing said spatial up-sample algorithm and said amplitude quantizing algorithm comprises the steps of:
   determining a signature from said signal source;
   performing analysis of the signature;
   selecting optimal algorithms for said signature; and
   providing said optimal algorithms for processing said input data.

4. The data collection acceleration method as in claim 3 further comprising the step of:
   storing said signature linked with said optimal algorithms in a database if said signature linked with said optimal algorithms is not already stored.

5. A node for carrying out the method according to claim 1.

6. A communications network comprising at least one node according to claim 1.

7. The method of claim 1, wherein said step of applying a spatial up-sample algorithm and an amplitude quantizing algorithm to said input data in real-time is performed by a computer system receiving a carrier wave from a computer network, the carrier wave carrying information for executing said step of applying a spatial up-sample algorithm and an amplitude quantizing algorithm to said input data in real-time.

8. A computer readable medium having instructions embodied therein for the practice of the method of claim 1.

9. A data collection acceleration method comprising the steps of:
   establishing a spatial up-sample algorithm and an amplitude quantizing algorithm;
   sampling an amplitude of a signal source at a relatively high resolution;
   sampling the signal source at a relatively low characteristic spatial/temporal frequency (scan resolution);
   producing input data from said step of sampling the amplitude of said signal source and said step of sampling said signal source at a relatively low characteristic spatial/temporal frequency; and
   applying said spatial up-sample algorithm and said amplitude quantizing algorithm to said relatively low characteristic scan resolution, relatively high resolution amplitude input data in real-time on a line-by-line basis to create relatively high scan resolution, relatively low resolution amplitude data of substantially the same quality as if said signal source were sampled at a relatively high scan resolution, relatively high amplitude resolution and quantized into relatively high scan resolution, relatively low amplitude resolution output data.

10. The data collection acceleration method as in claim 9 further comprising the step of:
    configuring a device to execute said spatial up-sample algorithm and said amplitude quantizing algorithm; and
    enabling said device to perform said step of applying said spatial up-sample algorithm and said amplitude quantizing algorithm to said relatively low characteristic scan resolution, relatively high resolution amplitude input data.

11. The data collection acceleration method as in claim 10 wherein said device is a programmable frame grabber.

12. A data collection acceleration method as in claim 9 wherein said step of sampling is accomplished by use of a line scan camera.

13. The data collection acceleration method as in claim 9 wherein said step of establishing a spatial up-sample algorithm and an amplitude quantizing algorithm comprises:
    determining a signature from the signal source;
    performing signature analysis to select optimal algorithms for said signature and storing said signature linked with said optimal algorithms in a database if said signature linked with said optimal algorithms is not already stored; and
    providing said optimal algorithms for processing said input data.

14. A node for carrying out the method according to claim 9.

15. A communications network comprising at least one node according to claim 9.

16. The method of claim 9, wherein said step of applying a spatial up-sample algorithm and an amplitude quantizing algorithm to said input data in real-time is performed by a computer system receiving a carrier wave from a computer network, the carrier wave carrying information for executing said step of applying a spatial up-sample algorithm and an amplitude quantizing algorithm to said input data in real-time.

17. A computer readable medium having instructions embodied therein for the practice of the method of claim 9.

18. A data collection acceleration system comprising:
    a data collection subsystem for sampling an amplitude of a signal source at a relatively high resolution and for sampling said signal source at a relatively low characteristic scan resolution, said data collection subsystem providing relatively low characteristic scan resolution, relatively high resolution amplitude input data; and
    a data processing subsystem operably connected to said data collection subsystem, said data processing subsystem capable of real time conversion of said relatively low characteristic scan resolution, relatively high resolution amplitude input data to relatively high scan resolution, relatively low resolution amplitude output data.

19. The data collection acceleration system of claim 18 further comprising an algorithm selection subsystem, said algorithm selection subsystem operably connected to said data processing subsystem, said algorithm selection subsystem capable of establishing at least one algorithm in said data processing subsystem, said data processing subsystem capable of executing said at least one algorithm against said relatively low characteristic scan resolution, relatively high resolution amplitude input data.

20. The data collection acceleration system of claim 19 wherein said at least one algorithm is selected from a group consisting of a spatial up-sample algorithm and an amplitude quantizing algorithm.

21. The data collection acceleration system of claim 20 wherein said spatial up-sample algorithm is capable of converting said relatively low characteristic scan resolution, relatively high resolution amplitude input data to relatively high scan resolution, relatively high resolution amplitude intermediate data.

22. The data collection acceleration system of claim 21 further comprising a first storage location operably connected to said data processing subsystem, said first storage location being capable of storing said relatively high scan resolution, relatively high resolution amplitude intermediate data.

23. The data collection acceleration system of claim 21 wherein said amplitude quantizing algorithm is capable of converting said relatively high scan resolution, relatively high resolution amplitude intermediate data to relatively high scan resolution, relatively low resolution amplitude output data.

24. The data collection acceleration system of claim 23 further comprising a second storage location operably connected to said data processing subsystem, said second storage location being capable of storing said relatively high scan resolution, relatively low resolution amplitude output data.

25. The data collection acceleration system of claim 18 wherein said data collection subsystem comprises a data collection device, said data collection device having a relatively low characteristic scan resolution.

26. The data collection acceleration system of claim 25 wherein said data collection device is a line scan camera.

27. The data collection acceleration system of claim 26 wherein a programmable frame grabber executes a computer code, said computer code forming a data buffer having said relatively low characteristic scan resolution, relatively high resolution amplitude input data, said data buffer having a plurality of lines, said data buffer having an oldest line of data and a newest line of data, said computer code executing said at least one algorithm against said data buffer creating a single line of processed data, said single line being transmitted to computer memory, said oldest line of data being deleted after said single line is transmitted, receiving said newest line of relatively low characteristic scan resolution, relatively high resolution amplitude input data as they are sampled after said single line is transmitted.

28. The data collection acceleration system of claim 18 wherein said data processing subsystem comprises a programmable frame grabber.

29. The data collection acceleration system of claim 28 wherein said programmable frame grabber executes a computer code, said computer code forming a data buffer having said relatively low characteristic scan resolution, relatively high resolution amplitude input data, said data buffer having a plurality of lines, said data buffer having an oldest line of data and a newest line of data, said computer code executing said at least one algorithm against said data buffer creating a single line of processed data, said single line being transmitted to computer memory, said oldest line of data being deleted after said single line is transmitted, receiving said newest line of relatively low characteristic scan resolution, relatively high resolution amplitude input data as they are sampled after said single line is transmitted.

30. The data collection acceleration system of claim 18 wherein said data processing subsystem executes a computer code, said computer code forming a data buffer having said relatively low characteristic scan resolution, relatively high resolution amplitude input data, said data buffer having a plurality of lines, said data buffer having an oldest line of data and a newest line of data, said computer code executing said at least one algorithm against said data buffer creating a single line of processed data, said single line being transmitted to computer memory, said oldest line of data being deleted after said single line is transmitted, receiving said newest line of relatively low characteristic scan resolution, relatively high resolution amplitude input data as they are sampled after said single line is transmitted.

* * * * *